United States Patent [19]

Bando et al.

[11] Patent Number: 4,678,161
[45] Date of Patent: Jul. 7, 1987

[54] BALL VALVE

[75] Inventors: Yoshiaki Bando; Teruyoshi Asano; Shigenobu Kato, all of Saitama; Katsuhiko Tanioka, Shiga, all of Japan

[73] Assignee: Seikisui Kagaku Kogyo Kabushiki Kaisha, Osaka, Japan

[21] Appl. No.: 893,448

[22] Filed: Aug. 7, 1986

Related U.S. Application Data

[63] Continuation of Ser. No. 660,182, Oct. 12, 1984, abandoned.

[51] Int. Cl.$^4$ .......................... F16K 25/00; F16K 5/06
[52] U.S. Cl. ................................ 251/171; 251/287; 251/292; 251/315
[58] Field of Search ............... 251/171, 192, 312, 315, 251/316, 287, 292

[56] References Cited

U.S. PATENT DOCUMENTS

| | | | |
|---|---|---|---|
| 1,784,381 | 12/1930 | O'Stroske | 251/315 |
| 3,550,902 | 12/1970 | Pidgeon et al. | 251/315 |
| 4,023,773 | 5/1977 | Wise | 251/316 |
| 4,059,250 | 11/1977 | Guldener et al. | 251/315 |
| 4,099,705 | 7/1978 | Runyan | 251/315 |
| 4,103,865 | 8/1978 | Nanba et al. | 251/315 |
| 4,327,895 | 5/1982 | Blumenkranz et al. | 251/315 |
| 4,449,694 | 5/1984 | Hobart et al. | 251/171 |

OTHER PUBLICATIONS

Japanese Utility Model Application No. 57-105474.

Primary Examiner—Martin P. Schwadron
Assistant Examiner—Sheri M. Novack
Attorney, Agent, or Firm—Sughrue, Mion, Zinn, Macpeak and Seas

[57] ABSTRACT

A ball valve in which the ball of the valve is positively prevented from blowing out of the valve body in both directions, even if the valve is connected in the wrong direction or the fluid pressure is applied to the valve in the opposite direction. The ball is arranged in a valve body to selectively open and close a fluid passage in the body, and annular seals abut against the ball from both sides of the fluid passage, the annular seals being pushed towards the ball by seal carriers. In one embodiment, one of the seal carriers has a flange on the periphery of one end thereof, and the flange is locked to a step from inside which is formed on inner surface of one end portion of the valve body. In a second embodiment, the ball additionally has two grooves with abutting walls in respective ones of which a spindle and a pin coaxial with the spindle are fitted with the abutting walls positioned on the side of the one seal carrier.

5 Claims, 4 Drawing Figures

BALL VALVE

This is a continuation of Ser. No. 660,182, filed on Oct. 12, 1984 now abandoned.

BACKGROUND OF THE INVENTION

The present invention relates to ball valves, and more particularly to a ball valve in which the ball and seal carrier are prevented from blowing out of the valve body.

As an example of conventional ball valves, a so-called "union-type ball valve" is known in which a ball is arranged in a cylindrical valve body in such a manner that it can open and close a fluid passage therein. Annular seals abut against the ball from both sides in the fluid passage with the annular seals being pushed towards the ball by seal carriers. In such a ball valve, when connecting sleeves are connected to the valve body, the connecting sleeves push the seal carriers towards the ball. The seal carriers are pushed by the connecting sleeves which are connected to the valve body, for instance, with union nuts, so that the abutment pressures of the annular seals to the ball can be adjusted by tightening or loosening the union nuts. Therefore, when the annular seals are worn to the extent of causing leakage of fluid, the leakage can be eliminated by further tightening the union nuts.

The most serious drawback of a ball valve of this type is that, under the condition that the fluid passage is closed and the fluid pressure is applied, the union nut and the connecting sleeve cannot be removed from the valve body. In order to repair or replace the pipe line connected to the connecting sleeve, it is necessary to loosen the union nut thereby to remove the connecting sleeve. However, if the connecting sleeve is removed, the ball and the seal carrier may blow out of the valve body due to the fluid pressure. Thus, the removal of the connecting sleeve under this condition is dangerous.

In order to eliminate this drawback, a ball valve as disclosed by U.S. Pat. No. 3,550,902, for instance, has been proposed, in which one seal carrier is provided on only one side of the ball while the other seal carrier is made integral with the valve body. With this ball valve, piping is performed with the seal carrier faced towards the side to which the pressure is applied. However, the ball valve is still disadvantageous in that the adjustment to compensate for wear of the annular seals is carried out by further tightening only one of the union nuts. If tightening is repeatedly carried out in this manner, the center of the ball will be significantly displaced from the center axis of the spindle. As a result, the torque needed for turning the handle to turn the ball thereby to open and close the valve is increased; that is, the valve cannot be smoothly opened and closed. If the handle is forcibly turned, the spindle is pushed from one side only, as a result of which leakage occurs at the seals around the spindle.

U.S. Pat. Nos. 4,327,895 and 4,449,694 and Japanese Utility Model Application No. 105474/1982 disclose ball valves in which the seal carrier is screwed into the valve body in order to prevent the seal carrier from blowing out of the valve body. U.S. Pat. No. 4,059,250 discloses a ball valve in which a seal carrier having dogs along the periphery is turned after being pushed into the valve body so that the dogs are engaged with lips formed in the bore at each end of the valve body in order to prevent the seal carrier from blowing out of the valve body. However, employment of the above-described method of screwing the seal carrier into the valve body or turning the seal carrier after pushing into the valve body, it is necessary to use a special tool. Furthermore, the ball valve is intricate in construction, and accordingly the valve assembly and disassembly operations are time consuming.

SUMMARY OF THE INVENTION

Accordingly, the present invention provides a ball valve simple in structure in which a seal carrier having a flange on its outer periphery of one end is locked to a step formed on one end portion of the valve body to prevent the ball and the seal carrier from blowing out of the valve body. With this arrangement, seal tightening can be done from both sides to allow smooth operation of the valve without leakage.

DESCRIPTION OF THE PREFERRED EMBODIMENTS

Figure 1:
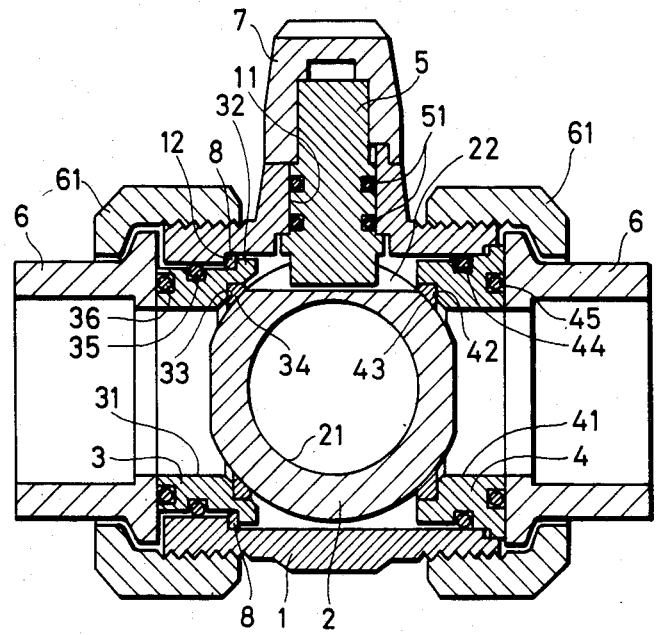
FIG. 1 is a sectional view showing an example of a ball valve according to a first embodiment of the invention.

A ball valve according to the present invention will be described with reference to the accompanying drawings. FIG. 1 is a sectional view showing an example of a ball valve constructed according to a first embodiment of the invention. In FIG. 1, reference numeral 1 designates a valve body; 2, a ball acting as a plug; and 3 and 4, seal carriers. Through-bores 21, 31 and 41 of substantially equal inside diameters are formed in the ball 2 and the seal carriers 3 and 4, respectively. These through-bores form a fluid passage.

A spindle receiving hole 11 is formed in the valve body 1 substantially at the center thereof. A spindle 5 with a flange is inserted into the hole 11 from inside the body 1, and the inner end portion of the spindle is engaged with a groove 22 formed in the ball 2. Accordingly, by turning the spindle 5, the through-bores 31 and 41 of the seal carriers 3 and 4 can be selectively communicated with the through-bore 21 and closed. The inner end portion of the spindle 5 has parallel surfaces the distance between which is equal to the width of the groove 22 so that it is fitted snugly in the groove 22.

At one end portion of the inside of the valve body 1 the inside diameter is reduced to form a step 12. The seal carrier 3, which is inserted into the end portion, has a flange 32 which is locked to the step 12. The seal carrier 3 is inserted into the valve body 1 from the end portion of the valve body opposite the end portion where the step 12 is formed, and the flange 32 is locked to the step 12 of the valve body 1.

Annular recesses 33 and 42 are formed on the sides of the seal carriers 3 and 4, respectively, abutted against the ball 2. Annular seals 34 and 43 are fitted in the recesses 33 and 42, respectively. By pushing the seal carriers 3 and 4 towards the ball 2, the annular seals 34 and 43 are pressed against the ball 2, thus maintaining the fluid passage in a sealed state.

In order to push the seal carriers 3 and 4 towards the ball 2, the valve employs a conventional union-type structure in which connecting sleeves 6 for connecting pipes are abutted against the outer end faces of the seal carriers, and under this condition, the connecting sleeves are fixedly secured by screwing union nuts 61 onto threads formed on the respective exterior surface of the end portion of the valve body 1. With the seal carriers 3 and 4 pushed towards the ball 2, gaps are formed between the two end faces of the valve body 1 and the connecting sleeves 6, respectively, so that the abutment pressures of the annular seals 34 and 43 to the ball 2 can be adjusted by further screwing the union nuts 61.

In FIG. 1, reference numerals 35 and 44 designate O-rings provided between the valve body 1 and the seal carriers 3 and 4; 36 and 45, O-rings provided between the seal carriers 3 and 4 and the connecting sleeves 6, respectively; and 51, O-rings provided between the spindle 5 and the valve body 1.

Further in FIG. 1, reference numeral 7 designates a handle provided to turn the spindle 5, and hence the ball 2, thereby to open or close the valve.

In the use of the above-described valve, piping is performed in such a manner that the seal carrier 3 is located downstream of fluid (the fluid pressure being applied to the valve from the side of the seal carrier 4). In this case, the connecting sleeve 6 can be removed by loosening the union nut 61 on the side of the seal carrier 3 with the valve closed by turning the ball 2 because the flange 32 of the seal carrier 3 is locked to the step 12 of the valve body 1. In the case where the annular seals 34 and 43 are worn, adjustment can be achieved with the center of the ball 2 substantially on the axis of the spindle 5 because both seal carriers 3 and 4 are pushed forward by tightening union nuts 61 from both sides.

In FIG. 1, reference numeral 8 designates an elastic packing. The packing 8 is disposed between the step 12 of the valve body 1 and the flange 32 of the seal carrier 3. Accordingly, even when the annular seals 34 and 43 are worn, the ball 2 is maintained in contact with the annular seals 34 and 43, and the contact pressure is distributed uniformly in the circumferential direction.

Figure 2:
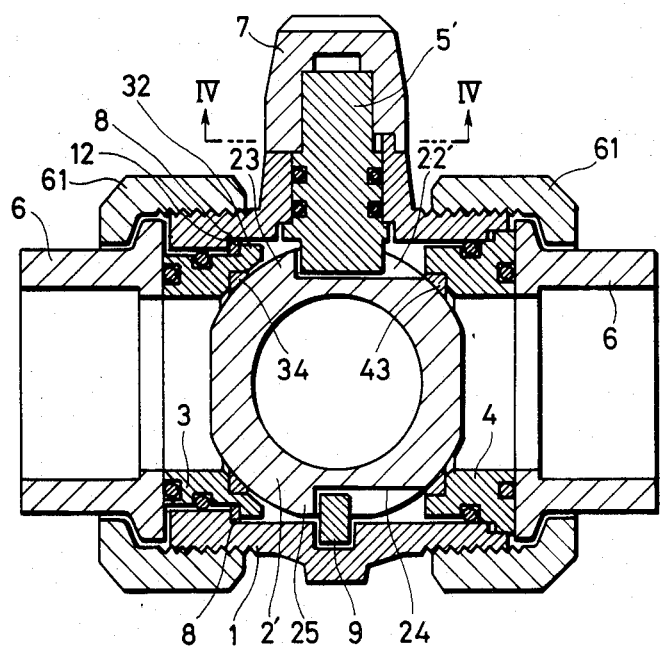
FIG. 2 is a sectional view showing an example of a ball valve according to a second embodiment of the invention.

FIG. 2 is a sectional view showing an example of a ball valve according to a second embodiment of the invention. The ball valve in FIG. 2 is the same as that in FIG. 1 except that the ball and spindle are partially different from the ball 2 and the spindle 5 in FIG. 1. Therefore, only the different points will be described.

Figure 3:
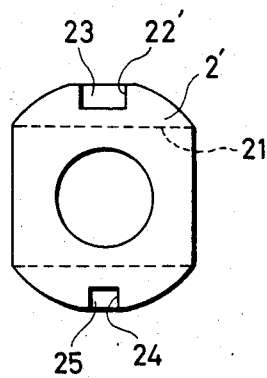
FIG. 3 is a front view of a ball in the ball valve in FIG. 2.

The ball 2' is assembled with its groove 22' engaged with the spindle 5'. The groove 22' has an abutting wall 23 at one end as shown in FIG. 3. A pin 9 coaxial with the spindle 5' is provided on the side of the valve body 1 opposite the side where the spindle 5' is provided. A groove 24 is formed in the side of the ball 2' opposite the side where the groove 22' is formed. The groove 24 has an abutting wall 25 which extends in the same direction as the abutting wall 23.

The ball 2' is inserted into the valve body 1 as follows: The seal carrier 3 is inserted into the valve body 1 and the spindle 5' and the pin 9 are set in the valve body 1. Under this condition, the ball 2' is inserted into the valve body 1 with the spindle and the pin engaged respectively with the grooves 22' and 24'. The spindle 5' is turned through 180° to reverse the direction of the ball 2 in the valve body 1. The locking mechanism of the handle 7 and the valve body 1 allows the ball 2' from closed position as shown in FIG. 3 to turn within the range of 90° to open position in one direction.

Figure 4:
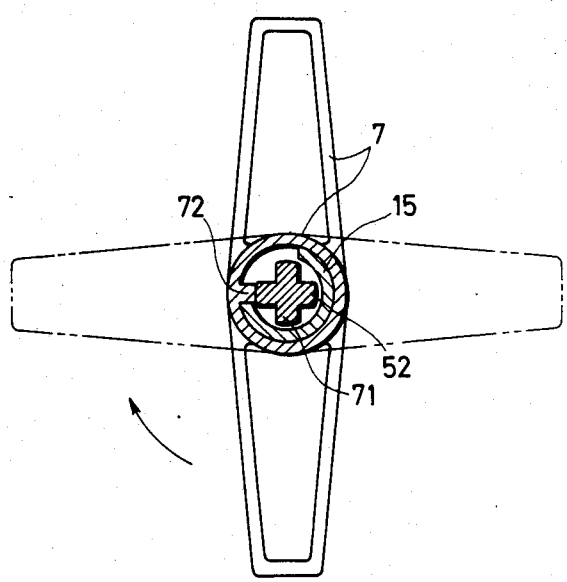
FIG. 4 is a sectional view taken along a line IV—IV in FIG. 2.

The locking mechanism of the handle 7 will be described with reference to FIG. 4. The upper end portion of the spindle 5' is formed into a cross-shaped fitting protrusion 52 which is fitted in a cross-shaped recess 71 formed in the handle 7. Therefore, the spindle 5' can be turned with the handle 6. An annular projection 13 with a cut extends from the upper surface of the spindle receiving hole 11 of the valve body 1, while a stop 72 is formed in the handle 7 engaged with the cut of the projection. Accordingly, the handle 7 can be turned through an angle which is defined by both ends of the cut between which the stop 72 is moved.

If the positions where the stop 72 strikes the two ends of the cut of the projection 13 are determined so that the valve is opened when the handle 7 is set in the direction of the fluid passage and the valve is closed when the handle is set in a direction perpendicular to the direction of the fluid passage, it can be detected from the direction of the handle 7 whether the valve is open or closed.

In the case where the valve in FIG. 2 is used, piping is performed in such a manner that the seal carrier 3 is located downstream of fluid. In the embodiment shown in FIG. 2, the seal carrier 3 prevents the ball 2' from blowing out of the valve body, similar to the case of the embodiment shown in FIG. 2, and the spindle 5' and the pin 9 prevent the ball 2' from blowing out of the valve body in the opposite direction. Therefore, even if the valve is connected in the wrong direction during piping or it is connected to a pipe where the fluid pressure is applied in both directions, the problem of the ball 2' blowing out of the valve body is prevented.

In the embodiment shown in FIG. 2, the pin 9 may be fitted in a hole formed in the wall of the valve body 1, or it may be formed integrally with the valve body 1. In the latter case, it is necessary for the height of the pin 9 protruding from the inner surface of the valve body to be smaller than the height of the flange 32 of the seal carrier 3, and for the flange 32 to have a small cut corresponding to the diameter of the pin 9. As the handle 7 is turned to turn the ball 2' thereby to open and close the valve, the ball 2' is turned about the pin 9. Therefore, it is preferable that the pin 9 be cylindrical.

In the ball valve of the invention as described above, one of the seal carriers has a flange, and the flange is locked to a step which is formed on an end portion of the valve body. Therefore, the seal carrier prevents itself and the ball from blowing out of the valve body, and, for instance, the pipe can be replaced if the connecting sleeve is removed after the union nut on the side of the seal carrier has been loosened. The abutment pressure of the annular seals against the ball can be adjusted through both seal carriers by further tightening or loosening the union nuts. Therefore, when the annular seals are worn, displacement of the center of the ball from the axis of the spindle can be minimized by further tightening the two union nuts evenly so that the handle can be operated smoothly at all times.

In the ball valve according to the second embodiment of the invention, the spindle and the pin prevent the ball from blowing out of the valve body, and in association with the effect of the ball valve according to the first embodiment of the invention, the ball is prevented from blowing out of the valve body in both directions. Even if the valve is connected in the wrong direction or the fluid pressure is applied to the valve in the opposite direction, the valve is secure.

We claim:

1. In a ball valve in which a ball is arranged in a valve body in such a manner as to selectively open and close a fluid passage in said body, and annular seals abut against said ball from both sides in said fluid passage, said annular seals being pushed towards said ball by a first and a second seal carrier, the improvement wherein:

said first seal carrier having a continuous flange formed on the periphery of one end adjacent said ball, said flange being locked to a step which is formed on an inner surface of one end of said valve body and a flat inner surface at the other end, said second carrier having a flat surface at its end adjacent said ball confronting said flat surface on said valve body on an inner surface of one end of said valve body, wherein a reaction biasing force is generated when said ball is forced against said first seal carrier, and wherein said reaction force maintains the seal between both of said seal carriers and said ball.

2. The improvement of claim 1, further comprising a spindle rotatably supported by said valve body, and a pin fixed to said valve body at a position opposite said spindle and coaxial therewith, said ball having two grooves with abutting walls in respective one of which said spindle and said pin are fitted with said abutting walls positioned on the side of said one seal carrier.

3. The improvement of claim 1 or 2, further comprising connecting sleeves each disposed at each end face of said seal carriers, end faces of said connecting sleeves confronting said seal carrier defining gaps with respect to both ends of said valve body.

4. The improvement of claim 1, further comprising; said valve body having on said inner surface of one end a flat portion extending from said step to the periphery of said valve body.

5. The improvement of claim 1, further comprising; said valve body having at said other end a continuous recess on the periphery thereof and said second seal carrier having a continuous flange formed at an outer end thereof.

* * * * *